US007398859B2

(12) United States Patent
Lewis et al.

(10) Patent No.: US 7,398,859 B2
(45) **Date of Patent: *Jul. 15, 2008**

(54) MAST CONSTRUCTION FOR A LIFT TRUCK

(75) Inventors: Robert Lewis, Chenango Bridge, NY (US); John A. West, Vestal, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,754

(22) Filed: Aug. 28, 2006

(65) Prior Publication Data

US 2007/0007081 A1 Jan. 11, 2007

Related U.S. Application Data

(63) Continuation of application No. 10/634,377, filed on Aug. 5, 2003, now Pat. No. 7,096,999.

(51) Int. Cl.
*B66F 9/06* (2006.01)
*B29D 30/06* (2006.01)

(52) U.S. Cl. ....................... 187/226; 187/227; 187/230; 414/628; 414/630; 414/631

(58) Field of Classification Search ................. 187/227, 187/226, 230, 9 E; 414/630, 628, 629, 631
See application file for complete search history.

(56) References Cited

U.S. PATENT DOCUMENTS 3,127,956 A 4/1964 Hosbein et al.
3,160,232 A * 12/1964 Savage ....................... 187/389
3,394,778 A 7/1968 Brinton
3,727,778 A 4/1973 Hollenbach
4,030,568 A 6/1977 Heinold
4,191,276 A * 3/1980 Farmer et al. ............... 187/227
4,238,004 A 12/1980 Olson
4,261,438 A 4/1981 Olson
4,355,703 A * 10/1982 Bartow ....................... 187/227
4,356,891 A 11/1982 Bartow
4,356,893 A 11/1982 Johannson
4,365,693 A 12/1982 McVeen
4,369,861 A 1/1983 Rietman
4,374,550 A 2/1983 Bartow
4,392,554 A 7/1983 Russey (Continued)

OTHER PUBLICATIONS

BT Industries AB; Product Infromation Reflex AC/ACi RR B, E; 748431-040; Reach Truck; BT Europe AB, ITS, Sweden; Oct. 2001.

(Continued)

*Primary Examiner*—Patrick Mackey
*Assistant Examiner*—Terrell Matthews
(74) *Attorney, Agent, or Firm*—Quarles & Brady

(57) ABSTRACT

A mast includes a base section, an outer telescopic section and an inner telescopic section which are raised and lowered by a pair of main lift cylinders. A fork carriage is slidably mounted to the inner telescopic section and is raised and lowered thereon by a pair of free lift cylinders. The mast elements are arranged to form two mast columns which produce minimum obstruction to the truck operator's field of view when looking forward through the mast.

24 Claims, 8 Drawing Sheets

U.S. PATENT DOCUMENTS

| | | | | |
|---|---|---|---|---|
| 4,441,585 | A | 4/1984 | Macnab | |
| 4,506,764 | A * | 3/1985 | Griesenbrock et al. | 187/227 |
| 4,585,093 | A | 4/1986 | Barda, Jr. | |
| 4,657,471 | A | 4/1987 | Shinoda et al. | |
| 4,721,187 | A * | 1/1988 | Riddle | 187/227 |
| 5,046,585 | A | 9/1991 | Ohta et al. | |
| 5,330,032 | A | 7/1994 | Warner | |
| 5,370,206 | A * | 12/1994 | Chao | 187/255 |
| 5,509,774 | A * | 4/1996 | Yoo | 414/622 |
| 5,984,050 | A * | 11/1999 | Ronald | 187/226 |
| 5,992,571 | A | 11/1999 | Lee | |
| 6,182,797 | B1 * | 2/2001 | Tebbe et al. | 187/227 |
| 6,505,710 | B1 * | 1/2003 | Kato | 187/230 |
| 6,571,970 | B1 * | 6/2003 | Spoeler et al. | 212/333 |
| 7,096,999 | B2 * | 8/2006 | Lewis et al. | 187/226 |

OTHER PUBLICATIONS

BT Industries AB; BT Product Information Vector C12.5; Combi Truck with Turret Head; BT Europe AB, SSD, 748431-040; Sweden; Sep. 2001.

BT; Trainier's Package GB C10/C12.5; Apr. 22, 2004?.

BT Products AB; Operator's Manual GB BT Vector C10/C12.5 (cover page); S-595 81 MJOLBY, Sweden; Nov. 24, 2003.

BT Industries AB; Service Manual EN; BT Vector C12.5; Feb. 24, 2003.

Dambach Lagersysteme GMBH & Co. KG; Kommissionierstapler Hi-Racker; www.dambach.de; unknown.

BT; Reflex RR B/E; 747500-040; ITS, Sweden; Sep. 2004.

Jungheinrich; Battery-powered reach trucks ETM/ETV 214/216; 2003.

Jungheinrich; ETM214/ETV214/ETM216/ETV216; Electric Reach Truck (1400, 1600 kg); www.hungheinrich.de; Sep. 2003.

Website www.BT-BTFORKLIFTS.COM; BT launches compact rear-wheel drive electric counterbalance range; Dec. 10, 2005.

BT Service Manual (cover page); Nov. 2005.

BT Service Manual (cover page); May 2006.

Nissan Motor Co., Ltd.; Nissan Cushion Tyre Models Gasoline/LPG; JX series gasoline models forklift; England; CEJOC-3/9807-1300 printed in Japan; Mar. 7, 1998.

Material Handling; Versatile Man-Up Stacker Provides Access to Both Sides of Very Narrow-Aisle Storage Systems; Thomas Publishing; Oct. 3, 2003.

www.MAGAZINER.DE; For Each Application-The Right Truck; Magaziner Lager-und Fordertechnik GmbH; Hutzeler Strabe 22-24; 29646 Bispingen; Aug. 2005.

Jungheinrich High Rack Stacker/Order Picker Capacity 120 kg; 1992.

Lindsay Gale; Red Hot; IVT 2001 Lift Truck & Materials Handling, 2001; pp. 33-36.

* cited by examiner

MAST CONSTRUCTION FOR A LIFT TRUCK

CROSS-REFERENCE TO RELATED APPLICATIONS

This is a continuation of U.S. patent application Ser. No. 10/634,377 filed Aug. 5, 2003 now U.S. Pat. No. 7,096,999.

BACKGROUND OF THE INVENTION

The field of the invention is industrial lift trucks, and particularly the telescopic masts for such trucks.

A lift truck typically is a battery powered vehicle having an operator compartment with controls that enable the operator to drive the truck and to hoist materials and carry them quickly throughout a factory or warehouse. An upright telescopic mast is attached to the forward end of the truck and with a carriage, or forks, supporting materials can be hoisted by extending the telescopic mast upward.

An exemplary lift truck is shown in FIGS. 1 and 2. It includes an operator compartment 10, a battery 11 and outriggers, or baselegs, 12A and B. A three section, telescopic mast 20 attaches to the front of the truck and includes a base section 21 and two telescopic sections 22 and 23. As shown best in FIG. 2, the lower telescopic section 22 (referred to in the art as the "outer" telescopic section) is nested within the base section 21 and the higher telescopic section 23 (referred to in the art as the "inner" telescopic section) is nested inward of the outer telescopic section 22.

A fork carriage 13 is slidable mounted to the inner telescopic section 23 and it is moved up and down thereon by carriage free lift cylinders 13A and B via chains 13C which pass over pulleys 13D. The outer telescopic section 22 is moved relative to the base section 21 by a main lift cylinder 22A located midway between the left and right mast sections. Lift chains (not shown in FIGS. 1 and 2) fastened to the base section 21, extending over pulleys at the top of the outer telescopic section 22, and fastened to the bottom end of the inner telescopic section 23 provide a simultaneous and coordinated movement of the inner telescopic section 23 relative to the outer telescopic section 22. Operation of the main lift cylinder 22A using controls in the operator compartment 10 may thus extend or contract the two telescopic sections 22 and 23. Operation of the carriage free lift cylinders 13A and B from the operator compartment 10 also controls the precise height of the fork carriage 13.

These mast elements plus the associated hydraulic hoses and electrical cable provide obstructions which limit the operator's field of view when looking forward towards the forks from the operator compartment 10. This is particularly true when the mast is lowered and all the cylinders 22A, 13A and 13B are disposed directly in front of the operator.

Many efforts have been made to improve the operators' field of view when looking forward through the mast. These include shortening the main lift cylinders as disclosed in U.S. Pat. Nos. 4,191,276 and 4,261,438 so that it does not obstruct view when the mast is lowered, shifting the location of the main lift cylinder to one side as disclosed in U.S. Pat. No. 4,355,703; shifting the location of the single main lift cylinder to one side and shifting a single carriage free lift cylinder to the other side as disclosed in U.S. Pat. No. 4,506,764; and shifting the location of the two carriage free lift cylinders to locations nearer the mast uprights to increase visibility as described in U.S. Pat. Nos. 4,369,861; 4,365,693; 4,030,568 and 4,441,585. Yet another approach disclosed in U.S. Pat. No. 4,585,093 is to locate the two carriage free lift cylinders substantially behind the mast uprights and provide two main lift cylinders which are also behind the respective mast uprights. This is carried one step further in U.S. Pat. No. 6,505,710 in which the two main lift cylinders are formed into the base section of the mast.

A significant constraint on the design of a lift truck mast structure is its fore to aft dimension. The length of a lift truck is a very important characteristic, since turning radius is directly related to length. The productivity of a truck and operator is directly related to the turning radius since in the tight confines of factories and warehouses a smaller turning radius translates to less back-and-forth jockeying of the truck. The elimination of one or more inches in the length of a truck therefore has significant economic significance.

SUMMARY OF THE INVENTION

The present invention is a telescopic mast for a lift truck in which the mast elements and associated lift elements are arranged to maximize the operator's field of view when looking forward from the operator compartment. More specifically, the mast includes: a base section having a pair of spaced upright base rail members attached to the lift truck; an outer telescopic section having a pair of spaced upright mid rail members slidably attached to the pair of base rail members and disposed laterally inward therefrom; an inner telescopic section having a pair of spaced upright top rail members slidably attached to the pair of mid rail members and disposed laterally inward therefrom; a pair of lift chain pulleys one mounted to the upper end of each mid rail member and disposed forward of the top rail members; a pair of lift chains, one disposed over each of the lift chain pulleys and having one end connected to the base rail member and a second end connected to the top rail member; and a pair of main lift cylinders connected between the base section and the outer telescopic section and being disposed behind the two mast columns formed by the mast sections, the main lift cylinders being operable to extend the mast upward by sliding the outer telescopic section with respect to the base section A general object of the invention is to maximize the operator's field of view when looking forward through the mast from an operator's compartment. By nesting the mid rail members in the base rail members and mounting the lift chain pulleys forward of the top rail members, the two obstructing profiles of the mast columns are minimized when viewed from the operator compartment.

Another aspect of the invention is the arrangement of the main lift cylinders and a pair of free lift cylinders. The free lift cylinders are mounted to the top rail members and positioned substantially behind the mast columns and laterally inward from the main lift cylinders. Operation of the free lift cylinders raises and lowers a carriage slidably mounted to the inner telescopic section. The lateral location of the free lift cylinders is asymmetric with respect to the truck center line to provide clearance for a hose pulley which the left cylinder supports without reducing operator visibility.

DETAILED DESCRIPTION OF THE PREFERRED EMBODIMENT

Figure 1:
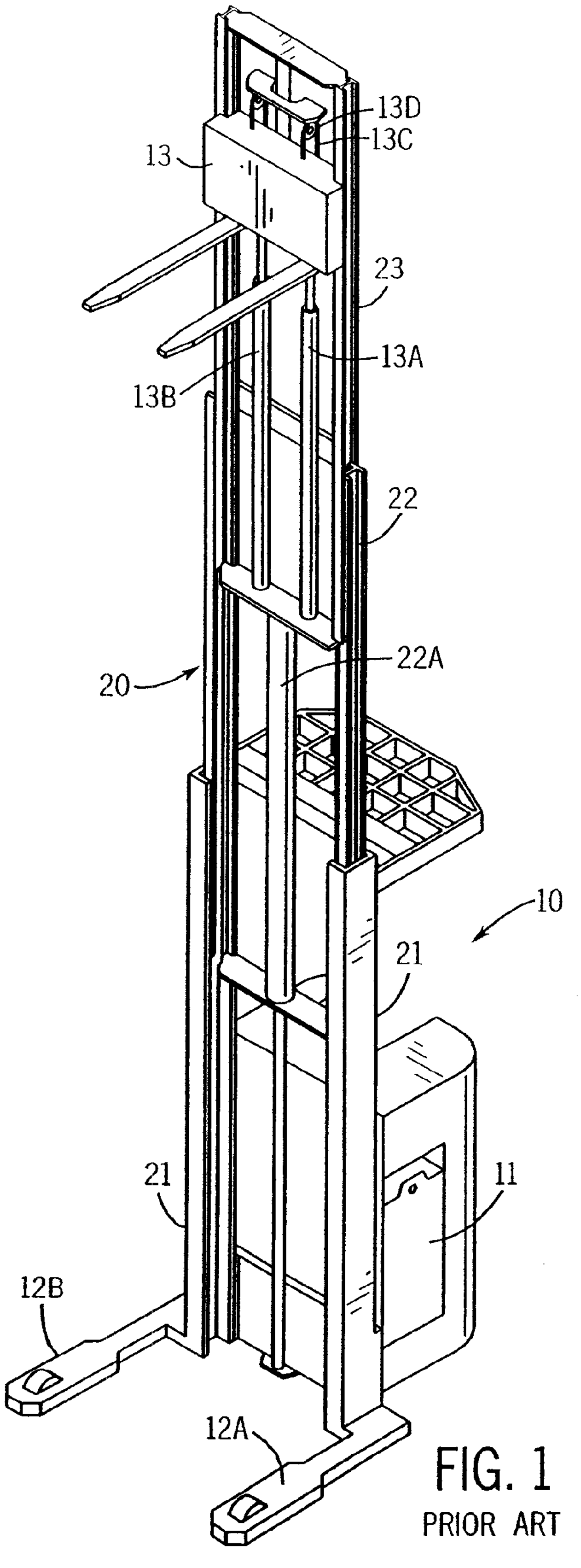
FIG. 1 PRIOR ART
FIG. 1 is a perspective view of a typical prior art lift truck.
Figure 2:
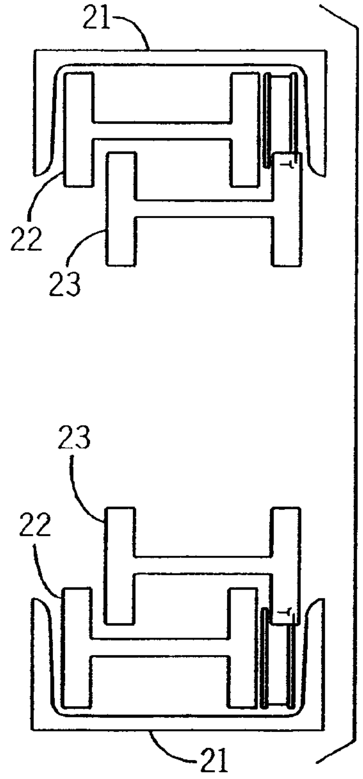
FIG. 2 PRIOR ART
FIG. 2 is a cross-sectional view through the mast of the prior art lift truck in FIG. 1.
Figure 3:
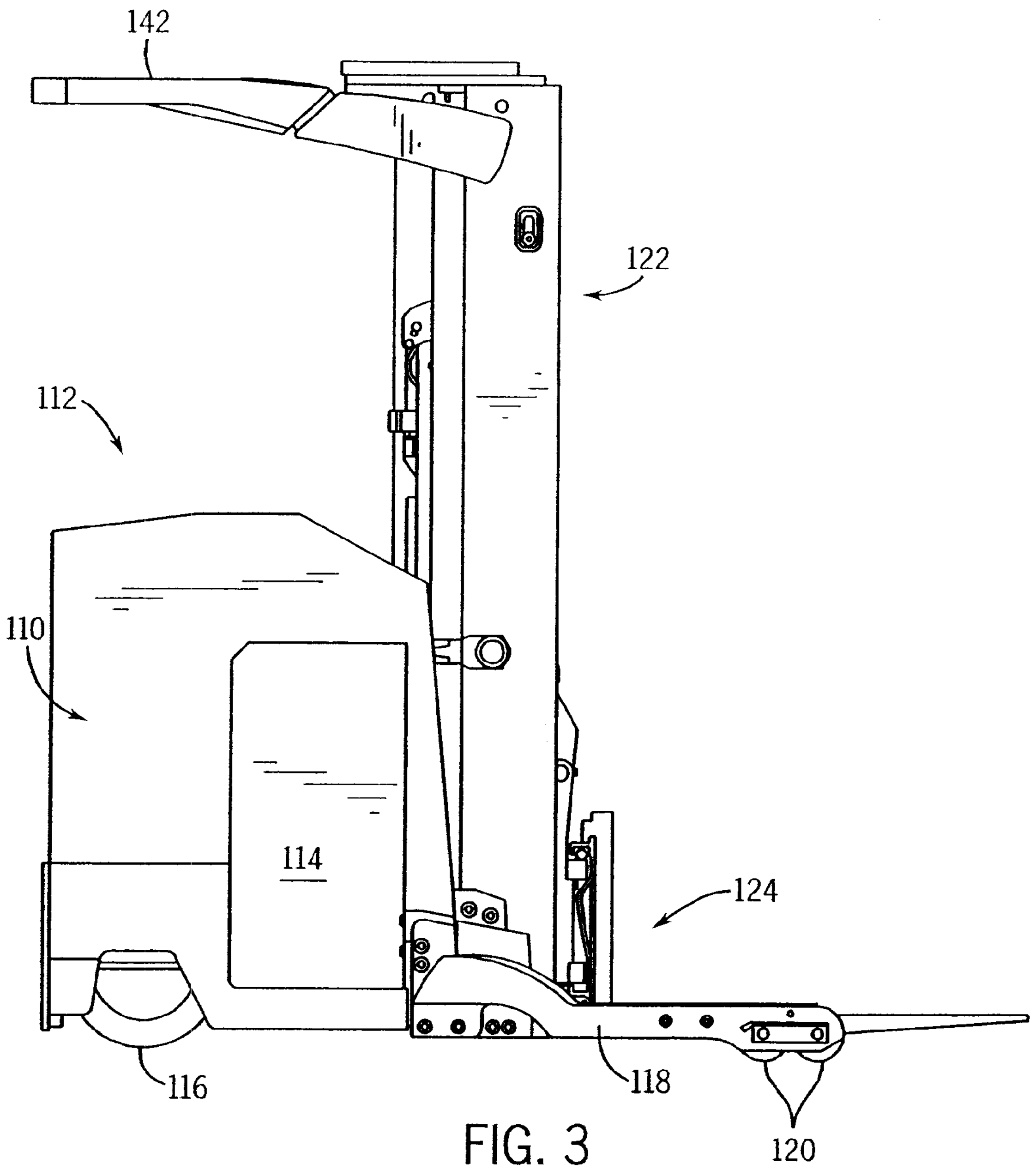
FIG. 3 is a side elevation view of a lift truck which employs the present invention.

Referring particularly to FIG. 3, a lift truck which employs a preferred embodiment of the invention includes a power unit 110 having an operator's compartment 112 located to the rear and a battery compartment 114 located at the forward end. The battery supplies power to a traction motor drive (not shown) which rotates a steerable drive wheel 116 to propel and steer the lift truck. A pair of laterally spaced baselegs 118 indirectly connect to, and extend forward from the power unit 110, and each baseleg includes wheels 120 which support the truck.

A mast 122 connects to the front end of the power unit 110 and extends vertically upward therefrom. The mast 122 supports a fork carriage 124 which can be elevated to different heights as will be described in detail below. The mast 122 is comprised of three telescopic sections which are shown best in FIGS. 4A and 4B. These include a base section 126, an outer telescopic section 128, and an inner telescopic section 130. Rollers mounted to the sections 126, 128 and 130 enable those sections to slide with respect to each other to allow the mast to be raised and lowered. These mast elements form two spaced mast columns which obstruct the operator's view when looking forward from the operator compartment. It is an objective of this design to reduce the profile of these mast columns and the associated mast elements to maximize the operator's forward field of view.

Figure 5A:
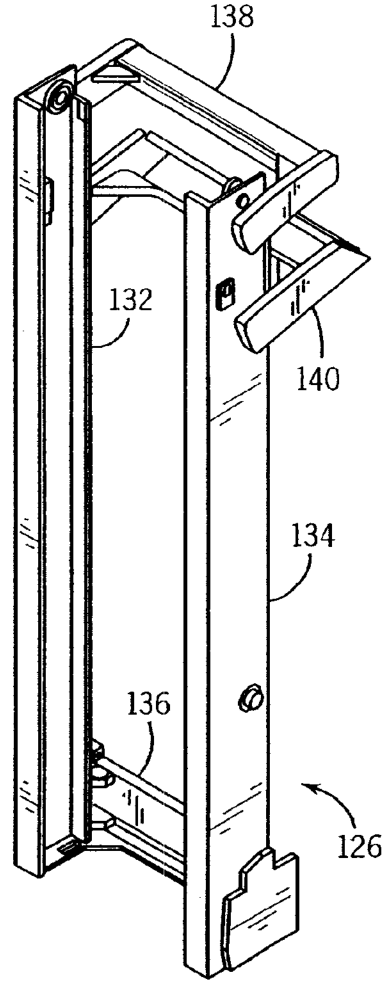
FIGS. 5A, 5B and 5C are perspective views of the respective base section, outer telescopic section and inner telescopic section of the mast structure of FIG. 4.

As shown best in FIG. 5A, the base section 126 is comprised of a pair of spaced, base rail members 132 and 134 connected together at their bottom ends by a base crosstie 136 and at their upper ends by a pair of crossties 138 and 140. The crossties 138 and 140 include a set of louvers which provide the desired structural rigidity and which are oriented at an angle which minimizes obstruction of the operator's view. The crosstie 140 also serves to support a protective guard 142 (see FIG. 3) above the operator. The base crosstie 136 attaches to the front of the power unit 110 and serves as a means for fastening the mast structure to the power unit 110.

Figure 5B:
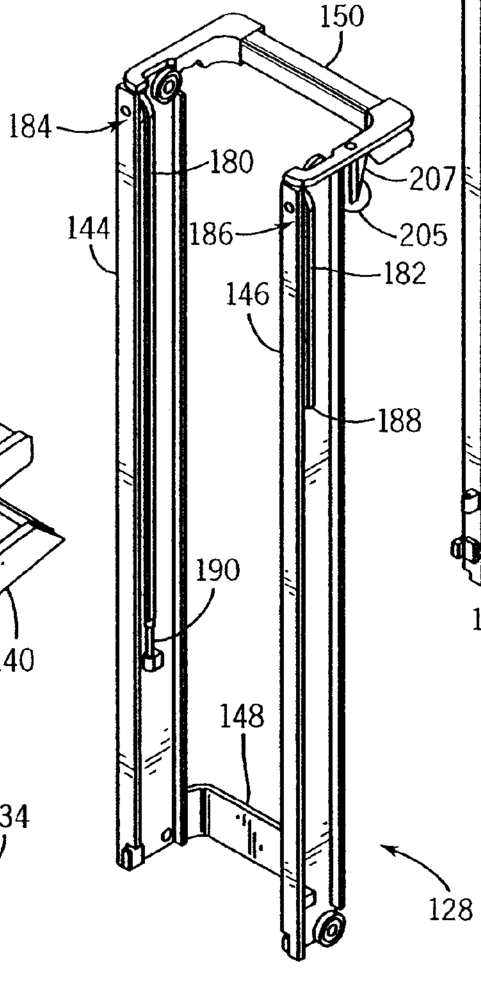

Referring particularly to FIG. 5B, the outer telescopic 128 is comprised of a pair of spaced, upright mid rails 144 and 146 connected at their lower ends by a lower crosstie 148. An upper crosstie 150 extends rearward from the upper ends of the mid rails 144 and 146 and then laterally across the space between the mid rails 144 and 146 to maintain their parallel alignment. The rearward extending portions of the crosstie 150 also provides a connection point for a pair of main lift cylinders to be described in more detail below.

Figure 5C:
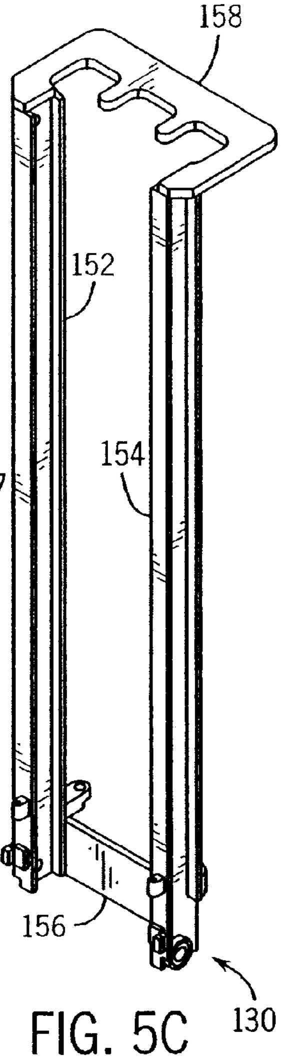
Figure 8:
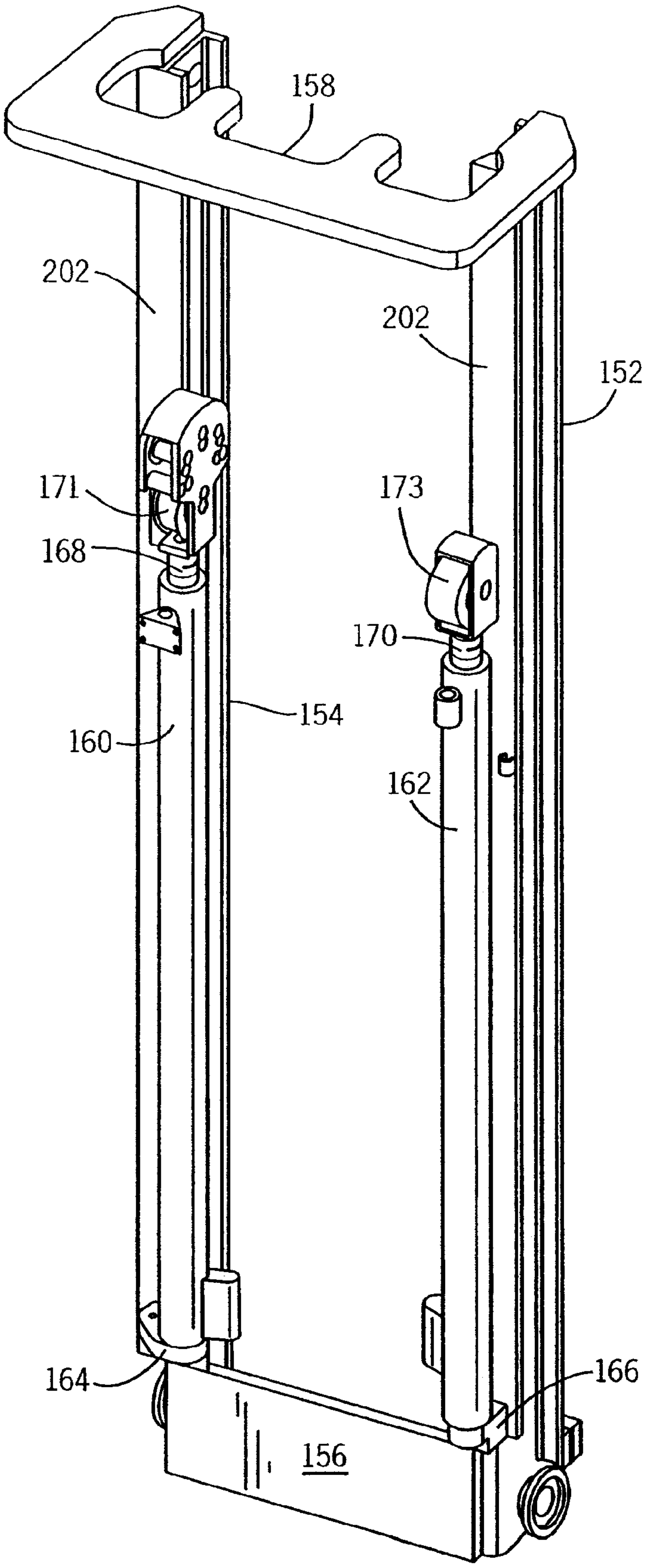
FIG. 8 is a perspective view of the inner telescopic section with attached free lift cylinders.

Referring particularly to FIGS. 5C and 8, the inner telescopic section 130 is comprised of a pair of spaced, upright top rails 152 and 154 connected at their lower ends by a lower crosstie 156 and connected at their upper ends by an upper crosstie 158. Upper crosstie 158 extends rearward and presents a horizontal platform having openings therein which enable the upper ends of a pair of free lift cylinders 160 and 162 to extend. The lower ends of free lift cylinders 160 and 162 mount to ears 164 and 166 that extend rearward from the top rails 154 and 152 adjacent the lower crosstie 156. The upper cylinder ends connect to a rear flange 202 of the top rails 152 and 154 near their top ends. As will be described in detail below, the free lift cylinders 160 and 162 are hydraulically operated in response to commands from the operator to extend and retract rods 168 and 170 to raise and lower the fork carriage 124 that is slidably mounted to the top rails 152 and 154.

Figure 9:
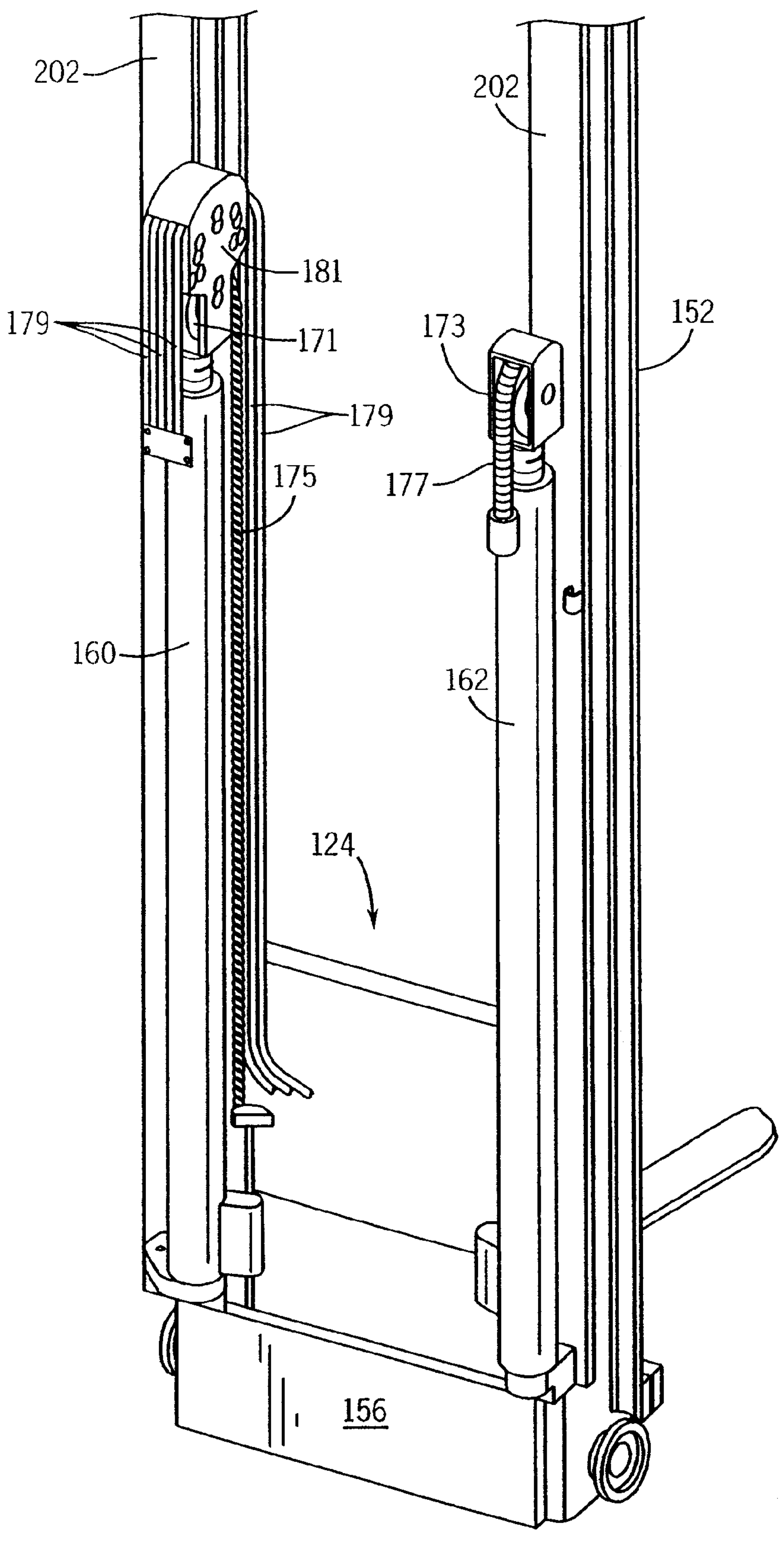
FIG. 9 is a partial perspective view of the inner telescopic section with slidably mounted fork carriage.

Referring particularly to FIGS. 8 and 9, free lift chain pulleys 171 and 173 are mounted to the top ends of the respective free lift cylinder rods 168 and 170. Free lift chains 175 and 177 extend over the respective pulleys 171 and 173 and one end of each chain is anchored to the rear side of respective free lift cylinders 160 and 162. The other end of each free lift chain drapes down the front side of their respective cylinders 160 and 162 and attaches to the back of the fork carriage 124. When the rods 168 and 170 of the free lift cylinders 160 and 162 are extended, the pulleys 171 and 173 move upward and the forward ends of the chains 175 and 177 are raised a corresponding amount to slide the fork carriage 124 upward on the inner telescopic section 130.

As shown in FIG. 9, the fork carriage 124 requires hydraulic hoses and cable 179 to operate a reach and retract mechanism mounted therein. These hoses and cable 179 extend over a hose pulley 181 which is mounted above the chain pulley 171 on the left free lift cylinder 160. One end of each hose and cable 179 is anchored on the rear side of the free lift cylinders 160 and the other end connects to the hydraulic and electrical circuits in the fork carriage 124.

Figure 4A:
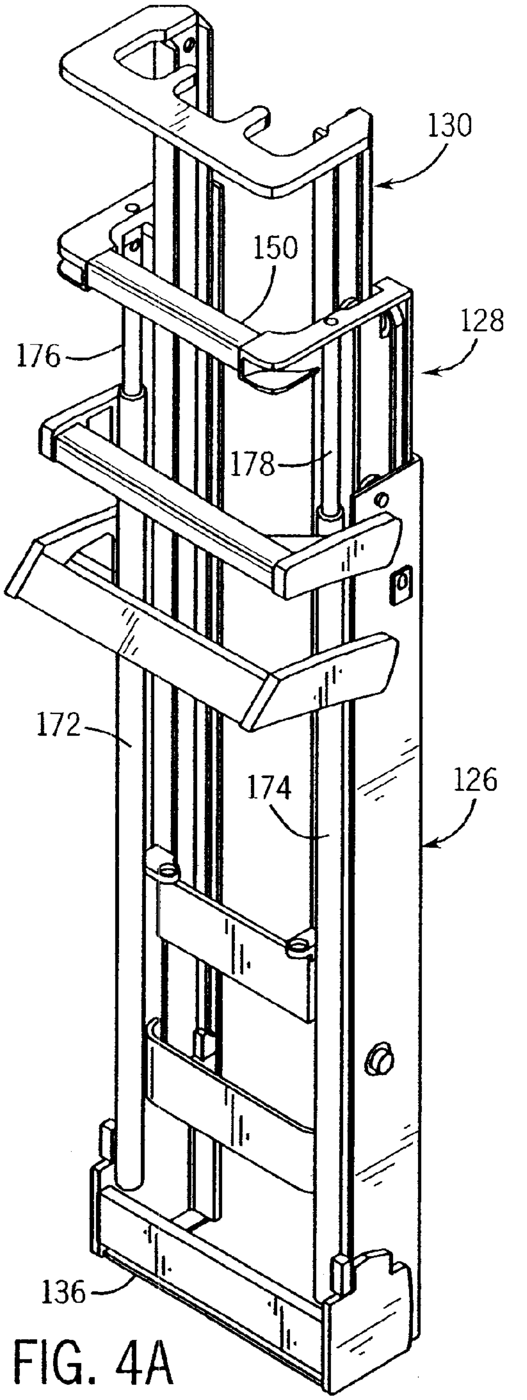
FIGS. 4A and 4B are perspective views of the mast structure of the lift truck of FIG. 3.
Figure 4B:
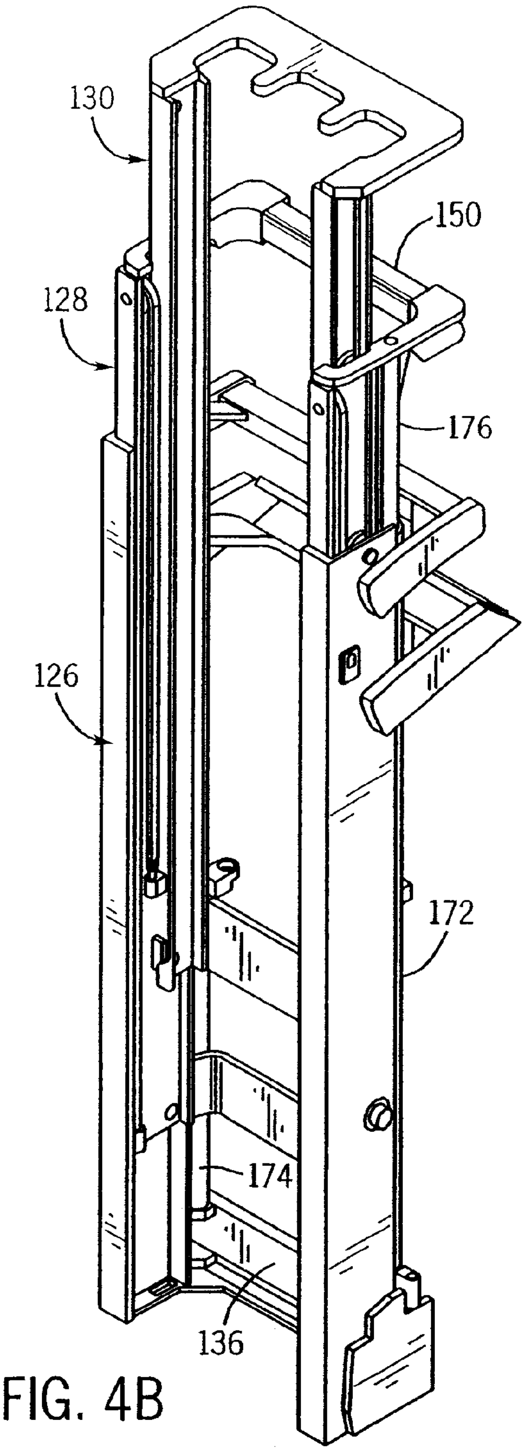

As shown best in FIGS. 4A and 4B, the telescopic mast structure is raised and lowered by a pair of main lift cylinders 172 and 174. The lower ends of the cylinders 172 and 174 are fastened to the base section 126 adjacent each end of base crosstie 136. Rods 176 and 178 extend upward from respective main lift cylinders 172 and 174 and fasten to the upper crosstie 150 on outer telescopic section 128. When the lift cylinders 172 and 174 are hydraulically operated in response to commands from the operator, the outer telescopic section 128 is lifted and lowered with respect to the base section 126 to extend and retract the mast.

As shown best in FIG. 5B, the telescopic motion of the outer telescopic section 128 in response to operation of the main lift cylinders 172 and 174 also operates the inner telescopic section 130 through a pair of lift chains 180 and 182. The lift chains 180 and 182 are supported by pulleys 184 and 186 mounted at the upper ends of respective mid rails 144 and 146 with their axes of rotation oriented in the fore and aft direction. An outboard end 188 of each lift chain 180 and 182 is connected to the inner telescopic section 130, and an inboard end 190 of each lift chain 180 and 182 is connected to the base section 126. When the outer telescopic section 128 is telescoped upward by the main lift cylinders 172 and 174, the pulleys 184 and 186 are lifted upward therewith, and the outboard ends 188 of the lift chains 180 and 182 also lift, or telescope upward to lift the inner telescopic section 130. Thus, the inner and outer telescopic sections 130 and 128 slide in unison when the main lift cylinders 172 and 174 are operated to extend or retract the mast.

Figure 6:
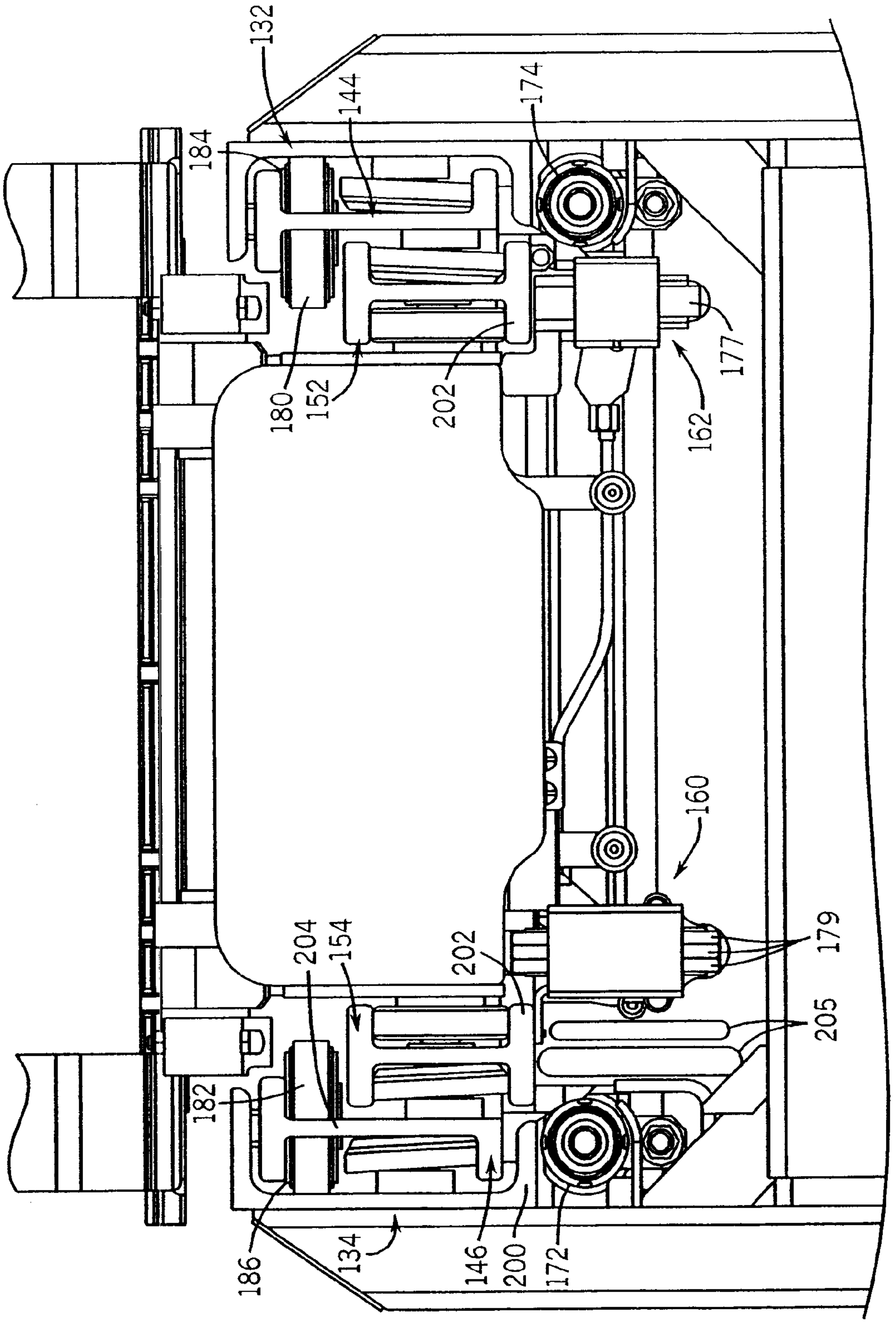
FIG. 6 is a partial top plan view of the lift truck of FIG. 3 showing the arrangement of mast elements according to a preferred embodiment of the invention.

Referring particularly to FIG. 6, the shape and location of the above mast assembly elements are designed to maximize the operator's field of view when looking forward through the mast. Looking at the left mast column, the C-shaped base rail 134 formed by a web and forward and rear flanges substantially encloses the I-shaped mid rail 146 which nests therein. The I-shaped mid rail 146 has a web with a forward and rear flange. The I-shaped top rail 154 formed by a web and forward and rear flanges is immediately inboard the base rail 134 with their respective rear flanges 200 and 202 substantially aligned. The lift chain pulley 186 is mounted in the web 204 of the mid rail 146 and it is disposed forward of the top rail 154. The resulting assembly of mast elements is compact in the lateral direction without lengthening the truck in the fore/aft direction. The right side of the mast is a mirror image of the left side, although other elements now to be described are not necessarily symmetrically arranged. In addition to the compact arrangement of elements, the left and right mast columns provide protection for the lift chains 180 and 182.

Referring still to FIG. 6, other elements of the mast are also arranged to maximize the operator's field of view. The main lift cylinders 172 and 174 are positioned directly behind the respective base rails 134 and 132. By using two main lift cylinders 172 and 174 rather than one, their diameters may be reduced such that they do not significantly increase truck length when moved behind the mast. The right side free lift cylinder 162 is positioned directly behind the top rail 152 so as not to increase the lateral dimension of the right mast column. On the other hand, the left side free lift cylinder 160 is positioned behind and inboard the rear flange 202 of the top rail 154. This arrangement allows the free lift cylinder 160 to be moved forward approximately 0.25 inches so that the much larger hose pulley 181 that supports the hoses and cable 179 can be moved forward into the viewing "shadow" of the left mast column.

Another asymmetry between the left mast column and right mast column is a set of hose pulleys 205 disposed behind the left mast column, between the main lift cylinder 172 and the free lift cylinder 160. As shown in FIG. 5B, these pulleys 205 are mounted to a support bracket 207 that extends downward from the upper crosstie 150 on outer telescopic section 128. The hoses which these pulleys 205 support hang down through the extended height of the outer telescopic and are positioned laterally in the viewing shadow of the left mast column so as to not provide an additional obstruction to the operator's field of view. As will be explained below, this asymmetric arrangement of the left and right mast columns provides a maximum field of view for an operator who is positioned to the right of the central fore and aft axis 208 of the lift truck shown in FIG. 7.

Figure 7:
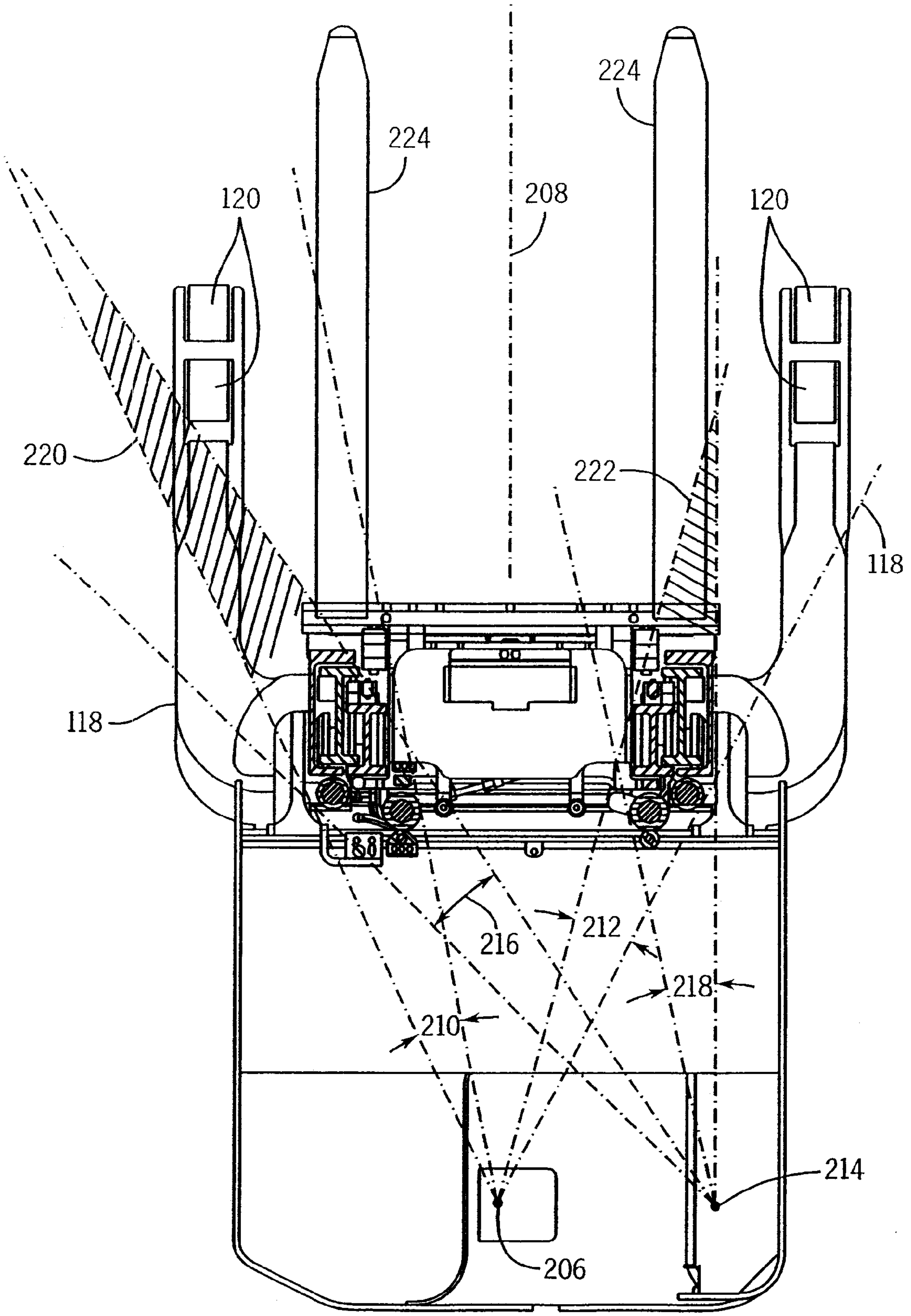
FIG. 7 is a top view of the lift truck of FIG. 3 with sight lines indicating the operator's field of view through the mast structure.

Referring particularly to FIG. 7, an operator positioned in the operator's compartment can assume a number of different positions which provide different fields of view when looking forward through the mast. When the operator takes a centered forward stance his field of view emanates from point 206 which is located near the fore and aft central axis 208 of the lift truck. Two regions 210 and 212 are blocked from view by the left and right mast columns when the operator is in this position.

The operator can also take a right forward position, in which his field of view emanates from a point 214 far to the right of the central axis 208. Two regions 216 and 218 are blocked from view by the left and right mast columns when the operator is in this position. It should be apparent that by shifting between these two operator positions the forward field of view extends to all but two, small triangular areas 220 and 222. Most importantly, the forks 224 are in complete view as are the ends of both baselegs 118. This expanded field of view facilitates driving the truck in confined spaces and placing loads on the forks 224.

The invention claimed is:

1. A lift truck, comprising:

a power unit including a battery compartment and an operator's compartment;

a steerable wheel coupled to the power unit; and a mast coupled to the power unit and supporting a carriage, the mast comprising:

a base section having a pair of spaced, upright base rail members attached to and disposed forward of and on opposing sides of the operator's compartment of the lift truck;

an outer telescopic section having a pair of spaced, upright mid rail members slidably attached to the pair of base rail members and disposed laterally inward therefrom;

an inner telescopic section having a pair of spaced, upright top rail members slidably attached to the pair of mid rail members and disposed laterally inward therefrom;

a pair of lift chain pulleys, one mounted to the upper end of each mid rail member and each being disposed completely forward of the top rail members of the inner telescopic section;

a pair of lift chains, one disposed over each of the lift chain pulleys and having one end connected to the base rail member and a second end connected to the top rail member; and a pair of main lift cylinders connected between the base section and the outer telescopic section and being operable to extend the mast upward by sliding the outer telescopic section with respect to the base section, wherein the lift chains and the main lift cylinders are provided on opposing sides of the operator's compartment to provide an open viewing area through the mast.

2. The lift truck as recited in claim 1 in which each main lift cylinder is disposed to the rear of one of said respective base rail members.

3. The lift truck as recited in claim 1 further including a pair of free lift cylinders mounted to the inner telescopic section and being operable to slide the carriage up and down the inner telescopic section, said free lift cylinders being disposed to the rear of the inner telescopic section and on opposing sides of the open viewing area.

4. The lift truck as recited in claim 3 in which one of said free lift cylinders is connected to one of said top rail members and substantially laterally aligned therewith, and the other free lift cylinder is connected to the other top rail member and laterally aligned inboard of said other top rail member.

5. The lift truck as recited in claim 4 in which the free lift cylinders each include a rod having a chain pulley mounted to its end, and a pair of free lift chains extend over the respective chain pulleys and connect to the carriage.

6. The lift truck as recited in claim 5 in which a hose pulley is mounted to the end of the rod associated with said other free lift cylinder, and hoses extend over the hose pulley and connect to the carriage.

7. The lift truck as recited in claim 4 in which a hose pulley is mounted to the upper end of the outer telescopic section, the hose pulley being aligned laterally between one of said main lift cylinders and the other of said free lift cylinders and being disposed to the rear of the mid rail member of said outer telescopic section.

8. The lift truck as recited in claim 1 in which the base rail members each have a c-shaped cross section formed by a web and forward and rear flanges; the mid rail members each have an I-shaped cross section which is disposed laterally inboard the base rail member web and between the base rail member flanges; and the top rail members each have an I-shaped cross section formed by a web and forward and rear flanges, the top rail members each being disposed laterally inboard from both the base rail members and the mid rail member with their rear flanges substantially aligned with the rear flanges of the base rail members.

9. The lift truck as recited in claim 8 in which each lift chain pulley extends through the web portion of the mid rail member to which it mounts.

10. The lift truck as recited in claim 1 in which each mid rail member has a web portion and a forward flange; the top rail member has a web and a forward flange; and the lift chain pulleys are rotatably mounted in openings in the web portion of each respective mid rail member with their axes of rotation in the fore and aft direction, and wherein the lift chain pulleys are positioned between the forward flanges of the mid rail member and the top rail member.

11. A lift truck, comprising:

a power unit including a battery compartment storing a battery and an operator's compartment;

a steerable wheel coupled to the power unit; and a mast column coupled to the power unit and supporting a carriage, the mast column comprising:

a base rail member having a c-shaped cross section formed by a web portion and forward and rear flange portions;

a mid rail member slidably mounted to the base rail member and having an I shaped cross section with a web portion and a forward flange portion, the mid rail member being disposed substantially between the forward and rear base rail member flanges; and a top rail member slidably mounted to the mid rail member and having an I-shaped cross section formed by a web and forward and rear flange portions, the top rail member being disposed alongside and inward from the mid rail member with its rear flange substantially aligned in the fore and aft direction with the rear flange of the base rail member; and a lift chain pulley rotatably mounted to the mid rail member and positioned completely forward of the forward flange on the top rail member.

12. The lift truck as recited in claim 11 in which the lift chain pulley extends through an opening in the mid rail member web portion with its axis of rotation oriented in the fore and aft direction, and the lift chain pulley is disposed between the forward flanges of the mid rail member and the top rail member.

13. The lift truck as recited in claim 1, in which the base rail members are each formed to include a web and a forward flange and the lift chain pulleys are positioned rearward of the forward flanges of the base rail members.

14. The lift truck as recited in claim 13, in which the mid rail members are each formed to include a web and a forward flange, the mid rail members each being disposed laterally inboard the base rail member webs and rearward of the base rail member forward flanges and the lift chain pulleys are positioned rearward of the forward flanges of the mid rail members.

15. The lift truck as recited in claim 14, in which the top rail members are formed to include a web and a forward flange, the top rail members each being disposed laterally inboard from both the base rail members and the mid rail members, and wherein the lift chain pulleys are positioned between the forward flanges of the mid rail members and the forward flanges of the top rail members.

16. The lift truck as recited in claim 1 in which the base rail members each have a cross section formed by a web and forward and rear flanges; the mid rail members each have a cross section formed by a web and forward and rear flanges, the mid rail members each being disposed laterally inboard the base rail member web and between the base rail member flanges; and the top rail members each have a cross section formed by a web and forward and rear flanges, the top rail members each being disposed laterally inboard from both the base rail members and the mid rail members with their rear flanges substantially aligned with the rear flanges of the base rail members.

17. A lift truck, comprising:

a power unit including a battery compartment storing a battery and an operator's compartment;

a steerable wheel coupled to the power unit; and a mast coupled to the power unit and supporting a carriage, the mast comprising:

a base section having a pair of spaced, upright base rail members attached to and disposed forward of and on opposing sides of the operator's compartment of the lift truck;

an outer telescopic section having a pair of spaced, upright mid rail members slidably attached to the pair of base rail members and disposed laterally inward therefrom;

an inner telescopic section having a pair of spaced, upright top rail members slidably attached to the pair of mid rail members and disposed laterally inward therefrom;

a pair of lift chain pulleys, one mounted to the upper end of each mid rail member and each being disposed completely forward of the top rail members of the inner telescopic section;

a pair of lift chains, one disposed over each of the lift chain pulleys and having one end connected to the base rail member and a second end connected to the top rail member;

a pair of main lift cylinders fixed relative to the base section and connected to the outer telescopic section and being operable to extend the mast upward by sliding the outer telescopic section with respect to the base section, the main lift cylinders being disposed to the rear of one of said respective base rail members; and a pair of free lift cylinders mounted to the inner telescopic section and being operable to slide the carriage up and down the inner telescopic section, said free lift cylinders being disposed to the rear of the inner telescopic section, wherein the base rail members, mid rail members, and top rail members align to form a right and a left mast column, and the lift pulleys, main lift cylinders, and free lift cylinders are disposed adjacent the corresponding right and left mast columns to provide an open viewing area for an operator looking through the mast.

18. The lift truck as recited in 17, in which each main lift cylinder is disposed to the rear of one of said respective base rail members.

19. The lift truck of claim 17, wherein a hose pulley is disposed rearward of the top rail member of one of the right and left mast columns and in a viewing shadow of the selected mast column to provide a maximized field of view for an operator in the operator compartment.

20. The lift truck of claim 19, wherein the free lift cylinder corresponding to the selected right or left mast column is disposed rearward and inboard of the top rail member and adjacent the hose pulley.

21. The lift truck of claim 19, wherein the hose pulley is disposed rearward of the left mast column to provide maximized field of view for an operator in a right forward position.

22. The lift truck of claim 19, wherein the other of the pair of free lift cylinders is disposed directly rearward of the top rail member of the other of the right and left mast column.

23. The lift truck of claim 17, wherein the base rail members, the mid rail members, and the top rail members each comprise a web section, and a forward flange substantially perpendicular to the respective web sections, and wherein the web sections are substantially aligned along a side of the viewing area.

24. The lift truck of claim 18, wherein the lift chain pulley is disposed between the forward flange of the top rail member and the forward flange of the base rail member.

* * * * *

US007398859C1

(12) INTER PARTES REEXAMINATION CERTIFICATE (0264th)

United States Patent

Lewis et al.

(10) Number: US 7,398,859 C1

(45) Certificate Issued: May 24, 2011

(54) MAST CONSTRUCTION FOR A LIFT TRUCK

(75) Inventors: Robert Lewis, Chenango Bridge, NY (US); John A. West, Vestal, NY (US)

(73) Assignee: The Raymond Corporation, Greene, NY (US)

Reexamination Request:
No. 95/001,230, Oct. 15, 2009

Reexamination Certificate for:

| | |
|---|---|
| Patent No.: | **7,398,859** |
| Issued: | **Jul. 15, 2008** |
| Appl. No.: | **11/467,754** |
| Filed: | **Aug. 28, 2006** |

Related U.S. Application Data

(63) Continuation of application No. 10/634,377, filed on Aug. 5, 2003, now Pat. No. 7,096,999.

(51) Int. Cl.
*B66F 9/06* (2006.01)
*B29D 30/06* (2006.01)

(52) U.S. Cl. ........................ 187/226; 187/227; 187/230; 414/628; 414/630; 414/631

(58) Field of Classification Search ....................... 8/227
See application file for complete search history.

(56) References Cited

U.S. PATENT DOCUMENTS 2,698,873 A 4/1955 Allsworth
4,331,346 A 5/1982 Walters
4,721,187 A 1/1988 Riddle
4,949,816 A 8/1990 Brown
6,505,710 B1 1/2003 Kato

OTHER PUBLICATIONS

The Jungheinrich ETX–K 125 Spare Parts Catalogue Schwerzenbach, Switzerland, Nov. 1, 1995.
The Jungheinrich ETX–K 125 Operating Instructions, Schwerzenbach, Switzerland, Nov. 1, 1995, (with verified translation).
The Jungheinrich ETX–Kombi 125 Four Page Brochure, Hamburg, Germany, Mar. 1995, (with verified translation).
The Jungheinrich ETX–Kombi 125 Two Page Brochure, Hamburg Germany, May 1995, (with verified translation).
The Yale NTA Lift Truck Brochure, Greenville, North Carolina, 2001.
The BT Vector 12.5 Lift Truck Brochure, Langenhagen, German, Apr. 18, 2002, (with verified translation).
The Magaziner EK 12 Lift Truck Datasheet, Mar. 2002, (with verified translation).
Stein & Erden article about The Nissan JX with Optview, Munich, Germany, Jan. 2002, (with verified translation).

*Primary Examiner*—William C. Doerrler

(57) ABSTRACT

A mast includes a base section, an outer telescopic section and an inner telescopic section which are raised and lowered by a pair of main lift cylinders. A fork carriage is slidably mounted to the inner telescopic section and is raised and lowered thereon by a pair of free lift cylinders. The mast elements are arranged to form two mast columns which produce minimum obstruction to the truck operator's field of view when looking forward through the mast.

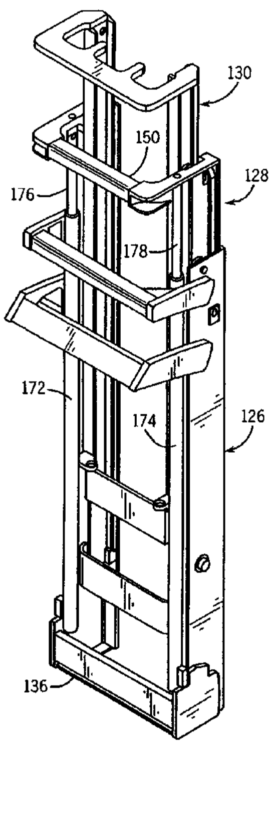

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-10, 13-17 and 19-23 is confirmed.

Claims 11 and 18 are determined to be patentable as amended.

Claims 12 and 24, dependent on an amended claim, are determined to be patentable.

11. A lift truck, comprising:

a power unit including a battery compartment storing a battery and an operator's compartment;

a steerable wheel coupled to the power unit; and a mast column coupled to the power unit *forward of the operator's compartment* and supporting a carriage, the mast column comprising:

a base rail member having a c-shaped cross section formed by a web portion and forward and rear flange portions;

a mid rail member slidably mounted to the base rail member and having an I shaped cross section with a web portion and a forward flange portion, the mid rail member being disposed substantially between the forward and rear base rail member flanges; and a top rail member slidably mounted to the mid rail member and having an I-shaped cross section formed by a web and forward and rear flange portions, the top rail member being disposed alongside and inward from the mid rail member with its rear flange substantially aligned in the fore and aft direction with the rear flange of the base rail member; and a lift chain pulley rotatably mounted to the mid rail member and positioned completely forward of the forward flange on the top rail member.

18. The lift truck as recited in *claim* 17, in which each main lift cylinder is disposed to the rear of one of said respective base rail members.

* * * * *